INVENTOR.
STANLEY F. GRAFF
BY
Merchant, Merchant + Gould
ATTORNEYS

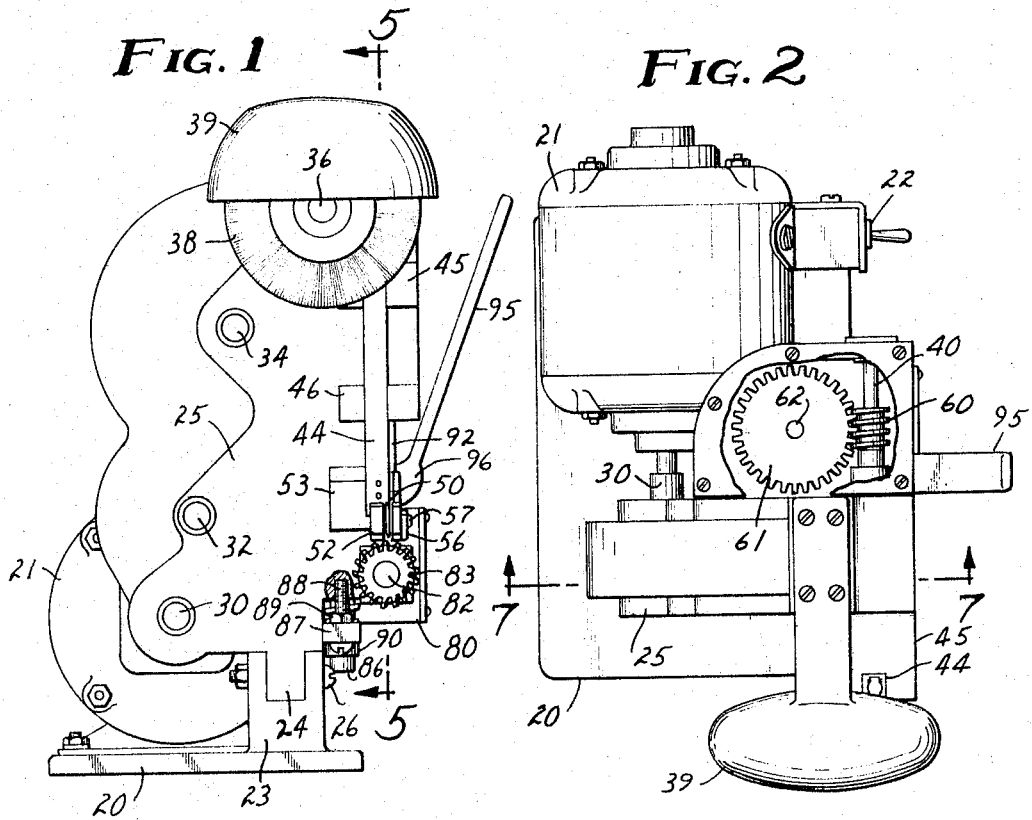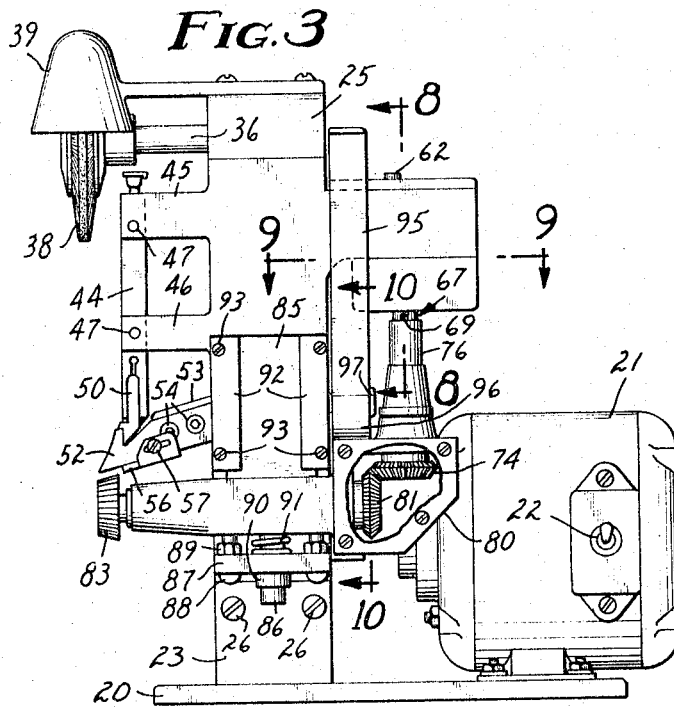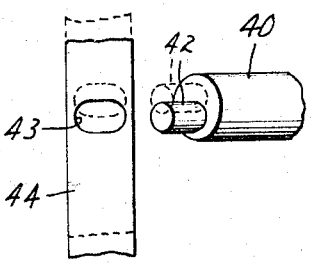

Jan. 24, 1967  S. F. GRAFF  3,299,454
STITCH CUTTING MACHINE
Filed March 5, 1965  3 Sheets-Sheet 3
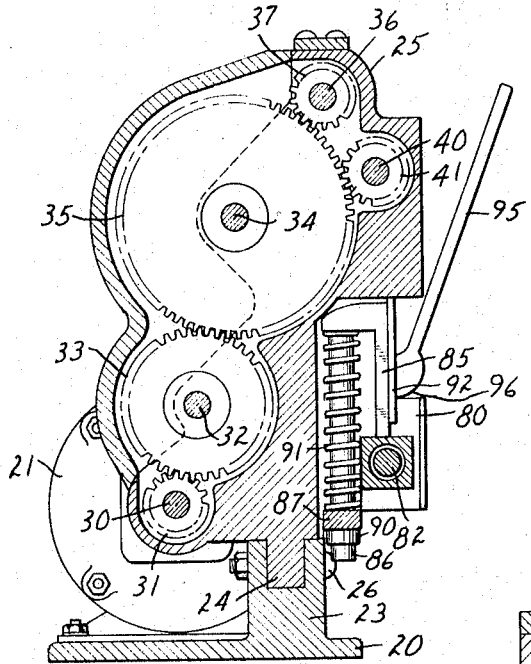
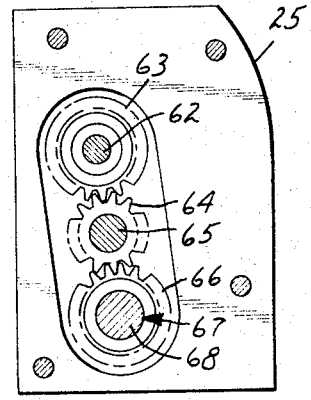
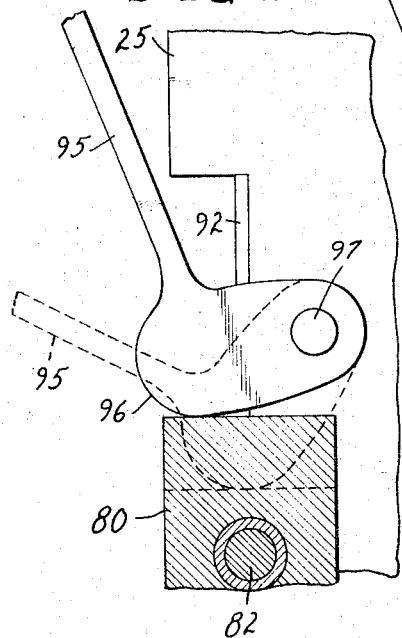
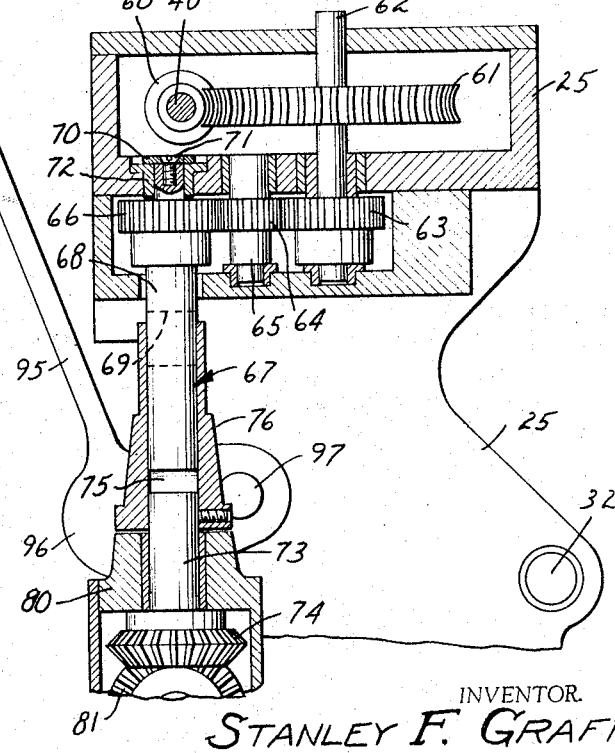
INVENTOR.
STANLEY F. GRAFF
BY Merchant, Merchant & Gould
ATTORNEYS

United States Patent Office 3,299,454
Patented Jan. 24, 1967

3,299,454
STITCH CUTTING MACHINE
Stanley F. Graff, 5252 Aldrich Ave. N.,
Minneapolis, Minn. 55419
Filed Mar. 5, 1965, Ser. No. 437,385
4 Claims. (Cl. 12—39.3)

This invention pertains to a new and improved stitch cutting machine and more specifically to a stitch cutting machine incorporating a reciprocating knife to which a new and improved knife guard and driving mechanism is added.

This invention pertains specifically to the stitch cutting machines of the type which operate on the stitches connecting a sole to the upper of a shoe and more particularly to machines which cut these stitches at the top surface of the welt of the shoe. In prior art machines of the type described the reciprocating knife is in general a straight piece of metal sharpened at the lower end thereof. In some of these prior art machines the knife is not provided with a guard and is therefore extremely dangerous to the operator as well as requiring a great deal of skill to cut the stitching without damaging the upper of the shoe. In some prior art machines a guard is provided but this guard and the knife are simply vertical pieces of metal which cannot easily be inserted into the slot of a shoe formed by the upper and the welt of the shoe. Therefore, these machines are hard to operate and relatively ineffective.

In the present invention a motor driven reciprocating knife is provided having a sharpened lower end which is extended outwardly at an angle to the axis of reciprocations. A knife guard is provided which effectively shields and encloses the knife in all positions except the fully extended cutting position. This knife guard also has the lower end thereof bent at an angle outwardly from the machine so that it fits easily into the slot in a shoe formed by the upper and the welt. Thus, the knife guard can be fitted into the slot in the shoe and slid therealong while the knife, which is completely enclosed by the guard except in the cutting position, cuts the stitches quickly and positively without endangering the operator or damaging the shoe in any way, regardless of possible ineptness of the operator.

Further, the present invention includes apparatus for adjusting the depth to which the knife and knife guard may be inserted into the slot in the shoe. This added mechanism allows the cutting edge of the knife to be made much smaller than prior art devices and still insures a positive cut of the thread. Whereas in prior art devices the cutting edge of the knife had to be wide enough to cover substantially the entire welt so that a positive cut of the thread would be obtained regardless of the type of shoe being run through the device, the present invention includes a much narrower knife and adjustment to insure a positive cut of the threads.

Thus, the present invention produces less damage to the welt and a shoe may be operated upon a greater number of times without noticeable effect thereon. In addition to the advantages already stated the present invention is geared so that the knife reciprocates a sufficient number of times per turn of the feed wheel which drives the shoe to insure that all of the threads holding the sole on the shoe are cut after circumventing the shoe once with the machine.

It is an object of the present invention to provide a greatly improved stitch cutting machine.

It is a further object of the present invention to provide a stitch cutting machine which is easy to operate and which is positive acting.

It is a further object of the present invention to provide a stitch cutting machine which is safe to operate and inflicts little or no damage to the shoe being operated upon.

These and other objects of the invention will become apparent to those skilled in the art upon consideration of the accompanying specification, claims, and drawings.

Referring to the drawings, wherein like characters indicate like parts throughout the figures:

FIG. 1 is a view in front elevation of the present invention;

FIG. 2 is a top plan, parts thereof broken away;

FIG. 3 is a view in side elevation, parts thereof broken away;

FIG. 7 is a sectional view taken along the line 7—7 in FIG. 2;

FIG. 8 is an enlarged sectional view taken along the line 8—8 of FIG. 3;

FIG. 9 is an enlarged sectional view taken along the line 9—9 of FIG. 3;

FIG. 10 is an enlarged sectional view taken along the line 10—10 of FIG. 3; and

FIG. 11 is a detailed view of the eccentric drive for the knife assembly with one of the components rotated 90°.

Figure 5:
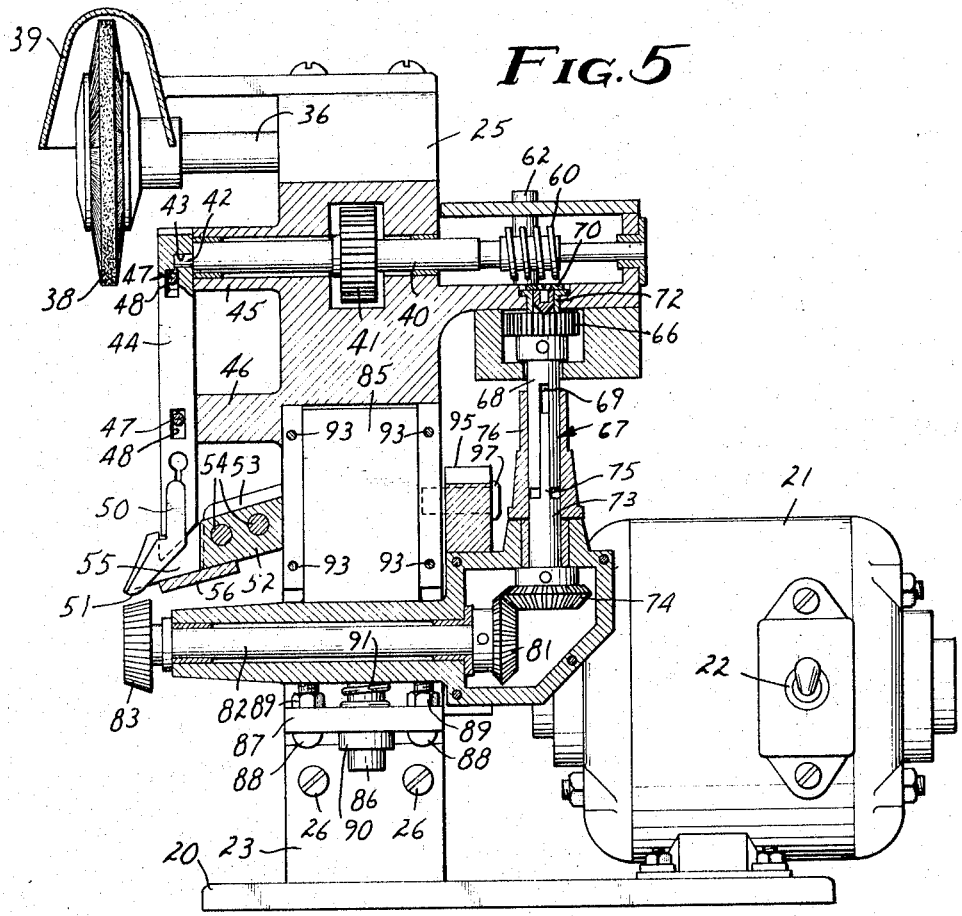
FIG. 5 is an enlarged sectional view taken along the line 5—5 of FIG. 1.
Figure 4:
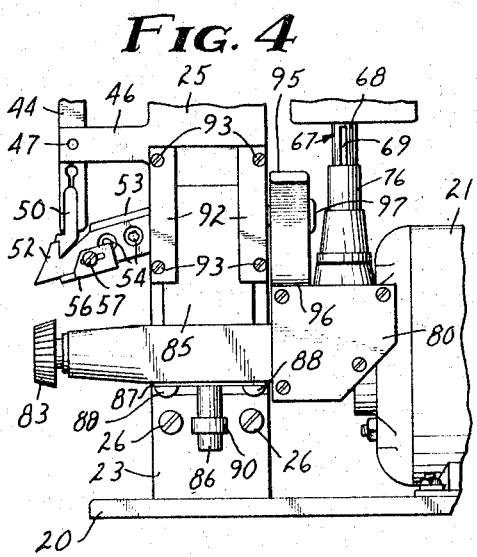
FIG. 4 is a view in side elevation similar to FIG. 3, parts thereof removed, illustrating the feed wheel in a different position.

In the figures the numeral 20 indicates a mounting base having a somewhat rectangular shape. Base 20 has a motor means, such as electric motor 21, mounted at one end thereof. Motor 21 is adapted to be connected to a suitable power source and has a switch 22 affixed to one side thereof for energizing and deenergizing the motor 21. The base 20 has a short mounting pillar 23, having a rectangular-shaped cross section and forming an integral part of the base, extending vertically therefrom in the same direction as the motor 21 but spaced horizontally from the motor 21. The pillar 23 has a bifurcated or grooved upper end therein which is mated to an extended portion 24 of an irregular-shaped housing 25. Housing 25 is fixedly secured to pillar 23 by some means such as bolts 26.

Referring to FIGS. 1, 2 and 7 a driven shaft 30 of motor 21, which extends horizontally from back to front through housing 25, has a gear 31 mounted thereon within housing 25. Rotatably mounted, vertically above the shaft 30 and parallel therewith is a shaft 32 having a gear 33 affixed thereto and operatively engaged with gear 31. A third shaft 34 is rotatably mounted, vertically above shaft 32 and parallel therewith and has a gear 35 affixed thereto which is operatively engaged with gear 33. Gears 33 and 35 are in the nature of idler gears mounted within housing 25 and simply transmit power from the motor 21 to sets of gears to be described presently. All of the gears and shafts described as well as those to be described in the remainder of the specification are mounted with bearings, etc. in the usual manner well known in the art.

A shaft 36, which is rotatably mounted vertically above the shaft 34 and parallel thereto, has a gear 37 affixed thereto within housing 25 which is operatively engaged with the gear 35. One end of the shaft 36 has a stitch cleaning brush 38 affixed thereto. Stitch cleaning brush 38 is partially enclosed by a shield 39 and is attached to an end of the shaft 36 at the exterior of housing 25 so that the stitch cleaning brush 38 is easily accessible.

A shaft 40 rotatably mounted within housing 25, parallel to shaft 34 but horizontally displaced therefrom has a gear 41 affixed thereto, which is in driving engagement with gear 35. Thus, as motor 21 rotates shaft 30, gear 31, which is affixed thereto, rotates gear 33 which in turn rotates gear 35 which in turn rotates gear 41 and shaft 40. One end of shaft 40 has a portion 42 with a greatly reduced diameter the axis of which is eccentrically located with respect to the axis of the remainder of the shaft. Eccentrically located portion 42 of shaft 40 is fitted into a slot 43 in a vertical bar 44.

A detailed view of the eccentric portion 42 and the slot 43 is illustrated in FIG. 11 wherein one of the components is rotated 90° and disengaged from the other component to better illustrate the two components. In FIG. 11 the dotted lines indicate the raised position while the full lines indicate the lowered position for both the bar 44 and the eccentric portion 42.

Referring to FIG. 5 the bar 44 is slidably mounted vertically by means of a pair of arms 45 and 46 extending from the front side of housing 25. The arms 45 and 46 are in line vertically and vertically spaced apart so that the bar 44 fits slidably into a bifurcated end on each of the arms. Thus, the bifurcated ends of the arms 45 and 46 form guides in which the bar 44 may slide freely. A horizontal pin 47 passes through the bifurcated ends of each of the arms 45 and 46 and through a pair of slots 48 in the bar 44 to limit the vertical movement of the bar 44 as well as movement longitudinally along the arms 45 and 46. As the shaft 40 rotates the eccentric portion 42 also rotates eccentrically about the axis of the shaft 40 and causes the bar 44 to move in a vertically reciprocating motion. The bifurcated ends of the arms 45 and 46 serve as guides to substantially prevent lateral movement of the bar 44 while allowing vertical movement.

A knife 50 is fixedly attached to the lower end of the bar 44 for reciprocating movement therewith. The knife 50 is a flat elongated blade mounted in a plane perpendicular to the front of the machine. The lower edge 51 of the knife 50 is sharpened for the cutting of stitches. The knife 50 is bent in approximately a 45° angle in the plane of the knife at approximately the midsection so that the sharpened portion 51 is extended outwardly from the axis of reciprocation of the bar 44 away from the front of the machine. Thus, as the bar 44 reciprocates the cutting edge 51 of the knife 50 reciprocates therewith but is extended outwardly in an easily accessible position.

A knife guard 52 is fixedly attached by means of a pair of screws 54 to an arm 53 extended outwardly from the front of housing 25. Knife guard 52 is somewhat wedge-shaped with the outer end and the lower side tapering to a thin horizontal edge which is adapted for insertion into the slot of a shoe formed by the junction of the upper and the welt. A vertical slot 55 extending axially from the outer end to approximately the midsection of the knife guard 52 is adapted to receive the knife 50 therein and substantially enclose the sharpened edge 51 of the knife 50 in all positions except the fully extended cutting position, or the extreme lowered position. Knife guard 52 is mounted on arm 53 of housing 25 so that the knife 50 reciprocates freely within the slot 55.

A depth gauge 56, which is a member having an L-shaped cross section, is adapted to engage the knife guard 52 along the bottom and one side thereof. The depth gauge 56 is attached to the knife guard 52 by means of a screw 57 passing through a slot in the vertical side of the depth gauge 56 and threaded into the side of the knife guard 52. The slot extends parallel to the bottom of the knife guard 52 and by loosening the screw 57 the depth gauge 56 may be moved forward or back relative to the knife guard. When the wedge-shaped end of knife guard 52 is inserted in the slot of a shoe the welt of the shoe butts against the forward edge of the depth gauge 56 and, thus, limits the extent to which the end of the knife guard 52 can be inserted into the shoe slot. By moving the depth gauge 56 forward the depth is reduced and by moving it backward the depth is increased.

Attached to horizontal shaft 40 for rotation therewith is a worm gear 60, which also is contained within housing 25. A gear 61 is rotatably mounted within housing 25 in operable engagement with worm gear 60 by means of a vertical shaft 62. Also mounted for rotation with shaft 62 and contained within housing 25 is a gear 63, which is displaced vertically below the gear 61 on shaft 62. An idler gear 64 is rotatably mounted in operable engagement with gear 63 by means of a shaft 65 which is parallel to shaft 62. A third gear 66 is rotatably mounted within housing 25 in operational engagement with gear 64 by means of a shaft generally designated 67 which is parallel to shaft 65.

Shaft 67 has an upper portion 68, the upper end of which has gear 66 mounted thereon and the lower part of which has a longitudinal slot 69 extending from the lower end to the midsection thereof. The slot 69 in portion 68 extends vertically out of the housing 25. The portion 68 of shaft 67 is mounted for rotation but is substantially prevented from longitudinal movement by a washer 70 fixedly attached to the upper end thereof by means of a screw 71 threaded into the end of the portion 68. A thrust bearing 72 is mounted to engage the portion 68 of shaft 67 between the washer 70 and the gear 66, thereby permitting portion 68 to rotate while preventing longitudinal movement thereof.

A lower portion 73 of shaft 67 is rotatably mounted coaxial with upper portion 68 and in juxtaposition thereto. The lower portion 73 of shaft 67 having a bevel gear 74 mounted at the lower end for rotation therewith has a longitudinal tongue 75 at the upper end extending approximately the same distance as the groove 69 and adapted for engagement therewith. Thus, the shaft 67 is longitudinally extendible by simply lowering the portion 73 of shaft 67 so as to reduce the amount of coupling between the tongue 75 and the groove 69. A sleeve 76 is fixedly attached to portion 73 for rotation therewith and extends coaxially over the entire tongue 75 of portion 73 and a substantial amount of the groove 69 in the portion 68 of shaft 67. Sleeve 76 prevents any transverse movement of portions 68 and 73 as well as providing a protective shield for the operator of the machine.

The lower end of portion 73 of shaft 67 including bevel gear 74 is mounted within a housing 80. A bevel gear 81 is mounted within housing 80 on one end of a shaft 82 in operable engagement with bevel gear 74 and for rotation about an axis perpendicular to the axis of rotation of gear 74. The other end of shaft 82 has a feed wheel 83 mounted thereon which is displaced vertically below the knife guard 52. The feed wheel 83 is mounted on shaft 82 outside the housing 80 so that it is accessible for placing a shoe thereon. The housing 80 is somewhat L-shaped with the portion 73 of shaft 67, sleeve 76 and bevel gear 74 forming one arm thereof, which is situated vertically in the machine, and the shaft 82 and bevel gear 81 forming the other arm of the L, situated horizontally in the machine, and having the feed wheel 83 at the extreme end thereof.

The housing 80 is attached to the housing 25 for vertical movement therebetween in the following manner. A plate 85 having an L-shaped cross section is fixedly attached to the housing 80 intermediate the horizontal portion thereof. The plate 85 may be an integral portion of the housing 80 and is situated in an inverted position so that the housing 80 is attached to the end of the long arm and the short arm, as shown in FIG. 7, extends toward the left side of the machine. A rod 86, affixed to the short arm of the member 85 and perpendicular thereto, extends the length of the long arm and a substantial distance under the horizontal arm of the housing 80.

A horizontal plate 87 is affixed to the housing 25 by means of a pair of bolts 88. Bolts 88 pass through the plate 87 and are threaded into the housing 25 as shown in FIG. 1. A nut 89 on each of the bolts 88 above the plate 87 holds the plate 87 vertically spaced below the housing 25 and nuts 89 in conjunction with bolts 88 form a height adjustment for feed wheel 83, as will be explained in more detail presently. The plate 87 is mounted to housing 25 so that it is parallel with the short arm of the member 85 and spaced vertically below it.

Rod 86 passes through a centrally located hole in plate 87 and has a nut 90 threaded onto the lower end thereof. A compression spring 91 encircling rod 86 between plate 87 and the short arm of member 85 biases member 85 and, hence housing 80, in the vertically upward position. A pair of plates 92 fixedly attached to housing 25 by means of four screws 93 are parallel with and in juxtaposition to the long arm of member 85. A plate 92 engages member 85 at either edge thereof and acts as a guide to substantially prevent rotation or lateral movement thereof. Thus, housing 80, which is biased in a vertically raised position, is free to move vertically downward by compression of spring 91 and movement of rod 86 through the hole in plate 87. As housing 80 moves vertically downward shaft 67 is extended longitudinally by the movement of tongue 75 of portion 73 in groove 69 of portion 67. Thus, feed wheel 83 is operatively connected to shaft 40 through shaft 82, bevel gear 81, bevel gear 74, shaft 67, gear 66, idler gear 64, gear 63, shaft 62, gear 61 and worm gear 60 whether the housing 80 is in the vertically raised or vertically lowered position. This series of gears and shafts in conjunction with gears 41, 35, 33 and 31 are designed to drive the feed wheel 83 at a speed sufficiently slow relative to the reciprocations of rod 44 and knife 50 to insure at least one cut per stitch of the threads attaching the sole to the welt of the shoe as the shoe is circumscribed by the present machine. To obtain proper relative speeds between the reciprocating knife 50 and the feed wheel 83 a gear ratio of approximately 60:1 is considered ample.

A somewhat L-shaped handle 95 has a heel or cam-shaped portion 96 at the apex of the short and long arm. The handle 95 is rotatably attached to the housing 25 by means of a bolt 97 threaded into one side of the housing 25. The handle 95 is positioned on housing 25 so that the cam surface 96 rests on a flat horizontal surface of the housing 80. As the handle 95 is depressed cam surface 96 pushes the housing 80 downwardly. When the handle 95 is released the compression spring 91 forces the housing 80 back into its extreme raised position. When the housing 80 is in its extreme raised position the feed wheel 83 is directly below the knife guide 52 and spaced therefrom slightly less than the width of an average shoe sole. This distance may be varied by adjusting the vertical height of plate 87 which is accomplished by threading the bolts 88 further into or out of housing 25. Through this adjustment the entire housing 80 can be raised or lowered a small amount to compensate for different styles of shoes having thicker or thinner soles.

Figure 6:
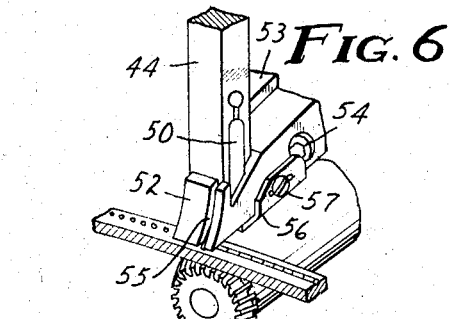
FIG. 6 is a view in perspective showing the details of the feed wheel and knife assembly.

The slot 55 and knife 50 are positioned slightly to the right of the center of feed wheel 83 so that feed wheel 83, which rotates counterclockwise, is pushing upwardly on the portion of the sole below the stitch which knife 50 is cutting. Once a shoe has been completely circumscribed by the machine, lever 95 is depressed to lower the feed wheel 83. The shoe on which the stitching has been cut is then removed from the machine and another shoe is placed in the machine after which the lever 95 is released to allow the feed wheel 83 to return to its extreme raised position. FIG. 6 illustrates a portion of a shoe sole and welt engaged between the feed wheel 83 and the knife guard 52.

Thus, I have disclosed a stitch cutting machine which has a knife 50 and a knife guard 52 formed to fit into the slot in a shoe produced by the junction of the upper and the welt and which introduce a maximum of safety for the operator and a minimum of abuse to the shoe. In addition, the present stitch cutting machine is geared so that the knife 50 reciprocates a sufficient number of times per turn of the feed wheel 83 to insure cutting of all of the threads in the shoe. Also, the feed wheel 83 may be easily raised and lowered by the operator to admit another shoe or remove the one already operated on because of the novel telescoping shaft 67 arrangement. The depth gauge 56, which determines the depth to which the knife guard 52 can be inserted into the slot formed by the junction of the upper and the welt of the shoe is a novel portion of the present improvement on a stitch cutting machine which allows the cutting edge 51 of the knife 50 to be made smaller since the position at which it engages the welt of the shoe can be adjusted.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In a stitch cutting machine the improvement comprising:
   (a) a knife mounted for reciprocating movement;
   (b) a knife guard formed to engage a shoe in the slot formed by the junction of the upper and the welt and mounted on said machine to substantially enclose said knife in all positions except the fully extended cutting position;
   (c) a depth gauge mounted on said machine to cooperate with said knife guard and adjustable to vary the depth to which said knife guard can be inserted into said slot;
   (d) a rotatably mounted vertically movable feed wheel associated with said knife guard for bearing against the underside of the sole of said shoe and maintaining said shoe in engagement with said knife guard when said feed wheel is in the normal or vertically raised position;
   (e) gear means, including a telescoping shaft for allowing vertical movement of said feed wheel, operatively connecting said feed wheel to said reciprocating knife in a ratio to cause said knife to reciprocate a sufficient number of times per revolution of said feed wheel to cut all of the threads holding the sole onto the shoe upon circumscribing the shoe once with said machine; and
   (f) motor means operatively connected to said gear means for rotating said feed wheel and reciprocating said knife.

2. In a stitch cutting machine the improvement substantially as set forth in claim 1 and having in addition manual means for lowering the feed wheel to replace a finished shoe with a shoe having the stitching therein.

3. In a stitch cutting machine the improvement substantially as set forth in claim 1 wherein the ratio of knife reciprocations to rotations of the feed wheel is approximately sixty to one.

4. In a stitch cutting machine the improvement substantially as set forth in claim 1 wherein the cutting lower end of the reciprocating knife is extended outwardly from said machine at an angle to the axis of the reciprocations of said knife for insertion of said knife into the slot of the shoe formed by the junction of the upper and the welt thereof.

References Cited by the Examiner

UNITED STATES PATENTS

| | | | |
|---|---|---|---|
| 1,687,152 | 10/1928 | Vitale | 12—39.3 |
| 2,307,136 | 1/1943 | Jones | 12—39.3 X |
| 2,476,691 | 7/1949 | Bennett | 12—39.3 |

PATRICK D. LAWSON, *Primary Examiner.*